(12) United States Patent
Kijima

(10) Patent No.: US 7,764,481 B2
(45) Date of Patent: Jul. 27, 2010

(54) OVERVOLTAGE PROTECTIVE DEVICE AND METHOD OF OVERVOLTAGE PROTECTION

(76) Inventor: Hitoshi Kijima, 79-20 Kawadera, Hanno-shi, Saitama (JP) 357-0044

( * ) Notice: Subject to any disclaimer, the term of this patent is extended or adjusted under 35 U.S.C. 154(b) by 910 days.

(21) Appl. No.: 11/597,974

(22) PCT Filed: Jul. 4, 2006

(86) PCT No.: PCT/JP2006/313287
§ 371 (c)(1),
(2), (4) Date: Nov. 29, 2006

(87) PCT Pub. No.: WO2007/066425
PCT Pub. Date: Jun. 14, 2007

(65) Prior Publication Data
US 2008/0278877 A1    Nov. 13, 2008

(30) Foreign Application Priority Data
Dec. 9, 2005    (JP)    ............... 2005-356118
May 9, 2006    (JP)    ............... 2006-130472

(51) Int. Cl.
H02H 1/00    (2006.01)
H02H 1/04    (2006.01)
H02H 3/22    (2006.01)
H02H 9/06    (2006.01)
H01C 7/12    (2006.01)

(52) U.S. Cl. ................. 361/117; 361/118; 361/91.1

(58) Field of Classification Search ......... 361/117–118, 361/91.1
See application file for complete search history.

(56) References Cited

U.S. PATENT DOCUMENTS 3,683,234 A    8/1972    Rodewald
(Continued)

FOREIGN PATENT DOCUMENTS

EP    0 192 801 A1    9/1986
(Continued)

OTHER PUBLICATIONS

Kijima, Hitoshi, "Earthing system and lightning protection," Corona Co., IEICE, Apr. 5, 2002, pp. 1-54, [cited on p. 8 of the English translation specification].
(Continued)

Primary Examiner—Jared J Fureman
Assistant Examiner—Dharti H Patel
(74) Attorney, Agent, or Firm—David N. Lathrop

(57) ABSTRACT

Problems can be solved about reducing the maximum voltage, reducing the size and cost, and so on. According to the invention, three or more discharge units are connected in series between two conductors. Two or more clamping type overvoltage protective units (hereinafter referred to as "clamping units") are connected in parallel to the discharge units except one or more of the discharge units. The overall operating voltage of the discharge units arranged in parallel to all the clamping units is set lower than any voltage obtained by subtracting from the operating voltage of each clamping unit, the spark-over voltages of the other discharge units connected in parallel to the clamping unit. The overall operating voltage of the discharge units connected in parallel to all the clamping units is set higher than the operating voltage of each discharge unit connected in series to any one of the clamping units.

16 Claims, 16 Drawing Sheets

U.S. PATENT DOCUMENTS 6,912,111 B2 * 6/2005 Pilschikov et al. .......... 361/118
2004/0120091 A1 6/2004 Pilschikov et al.

FOREIGN PATENT DOCUMENTS

| JP | S50-133440 | 10/1975 |
|----|------------|---------|
| JP | S57-111981 | 7/1982 |
| JP | 2002-010484 | 1/2002 |
| JP | 2006-136043 | 5/2006 |
| SU | 1669026 A1 | 8/1991 |

OTHER PUBLICATIONS

EP Extended Search Report, filed Feb. 25, 2009, Hitoshi Kijima.

* cited by examiner

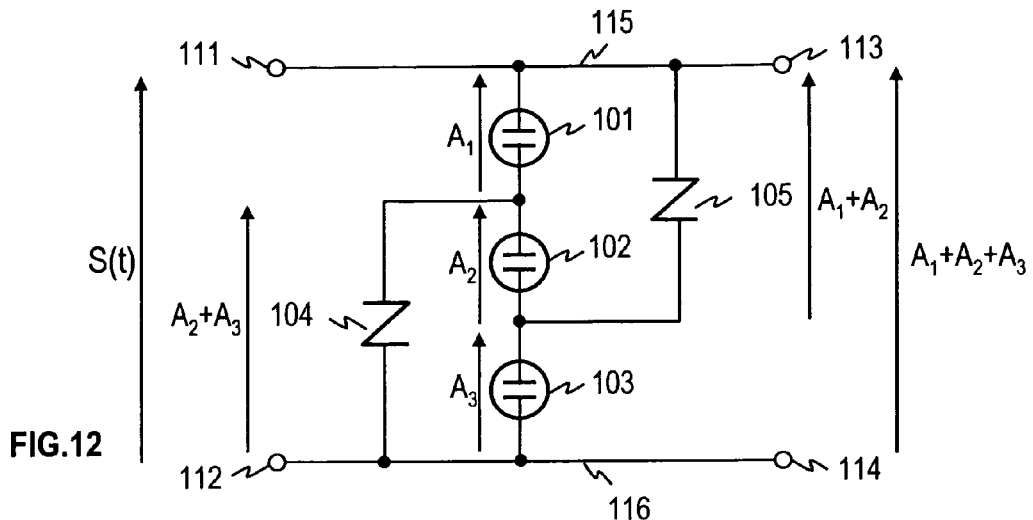
FIG.12
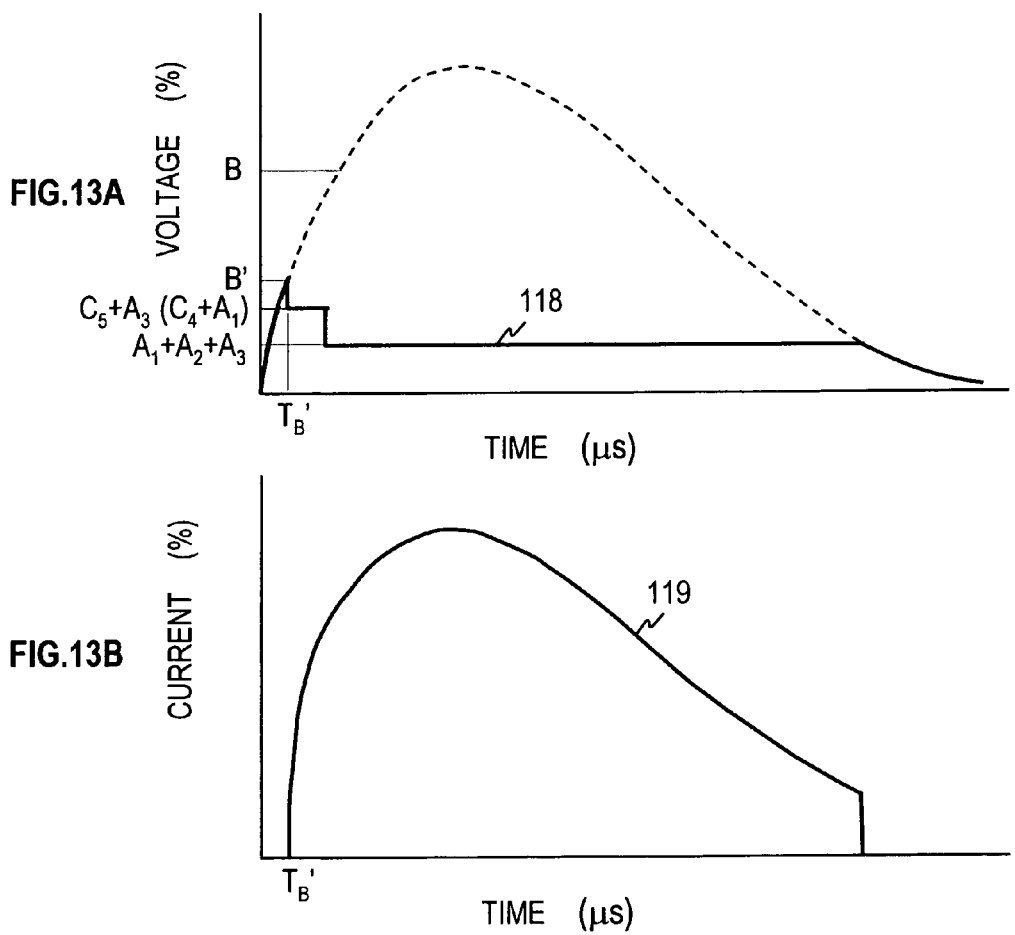
FIG.13A
FIG.13B

OVERVOLTAGE PROTECTIVE DEVICE AND METHOD OF OVERVOLTAGE PROTECTION

TECHNICAL FIELD

The present invention relates to an overvoltage protective device and a method of overvoltage protection for protecting apparatuses against overvoltage or overcurrent caused by lightning surge or high-voltage power line.

BACKGROUND ART

Both the characteristic of lightning surge, and overvoltage protection technologies have been introduced in the article "Earthing system and lightning protection," by Hitoshi Kijima, first edition, Corona Co., IEICE, Apr. 5, 2002, pp. 1-54 (Non-Patent literature 1). The technical background required for understanding the present invention will be briefly described below. FIG. 1 shows the profile S (t) of voltage or current caused by lightning surge. Generally, a direct lightning strike causes a current having a peak value of several tens of kA to flow, and an induced lightning surge causes a voltage having a peak value of several kV. Accordingly, values of voltage or current versus time are plotted in FIG. 1. In testing an overvoltage protective device, a voltage waveform having a peak value of 6 kV, a mean time to half value of 50 μsec, and a front time of 1.2 μsec is usually applied to observe the change of voltage.

Overvoltage protective components are mainly divided into two categories. One is clamping type and the other is switching type. Typical clamping type overvoltage protective components are varistors and diodes. These components are characterized by having a region in which an increase of current hardly causes voltage to vary. FIG. 2A shows a configuration for overvoltage protection using a varistor. Even when an overvoltage is applied across terminals 902 and 903, an overvoltage is not applied across terminals 904 and 905 by virtue of a varistor 901. FIG. 2B shows a configuration for overvoltage protection using a diode. In the configuration of FIG. 2B, two diodes are arranged in parallel to prevent overvoltage from being applied across terminals 944 and 945 when an overvoltage having positive polarity is applied to an terminal 942 as well as when an overvoltage having negative polarity is applied to the terminal 942. FIG. 2C shows an ideal change of voltage across indoor side terminals when a clamping type overvoltage protective component is used. In the case of an ideal clamping type overvoltage protective component, even when the outdoor side voltage exceeds operating voltage C, the indoor side voltage is approximately constant at operating voltage C as indicated by waveform 908. When the voltage across outdoor side terminals becomes lower than operating voltage C, the voltage across indoor side terminals also decreases. FIG. 2D shows the change of current flowing through a clamping type overvoltage protective component when the clamping type overvoltage protective component is used. In the overvoltage protective component, instantaneous power (voltage×current) is consumed, and there is generated a heat equivalent to energy (voltage×current×time) obtained by integrating the instantaneous power in the time domain. In the case of a clamping type overvoltage protective component, the operating voltage is relatively high, so when an extremely large current flows, its life may be affected by these instantaneous power and energy.

Switching type overvoltage protective components are represented by discharge tubes. Discharge tubes are components for overvoltage protection by a discharge phenomenon, with insulation between electrodes with gas (including vacuum), liquid, solid, or a mixture thereof. Typical discharge tubes are gas-filled discharge tubes and air gap discharge tubes. Discharge tubes are characterized in that when discharge starts, voltage significantly becomes lower. FIG. 3A shows a configuration for overvoltage protection using a gas-filled discharge tube, and FIG. 3B shows a configuration for overvoltage protection using an air gap discharge tube. FIG. 3C shows an ideal change of voltage across indoor side terminals, in the case of using a discharge tube. In the case of using a discharge tube, when an overvoltage applied from the outdoor side exceeds operating voltage B, the voltage across the overvoltage protective component terminals becomes sharply low by discharge. After the discharge starts, the voltage across the discharge tube terminals is lowered to spark-over voltage A. Waveform 918 represents the change. Thereafter when the voltage across outdoor side terminals becomes lower than spark-over voltage A, the voltage across indoor side terminals becomes the same spark-over voltage A. However, when a commercial power supply of, for example, 100 V is used, if spark-over voltage A is lower than 100 V, even after the overvoltage caused by a lightning surge disappear, discharge will continue due to the current supply from commercial power line. Accordingly, countermeasures are taken such as connecting other discharge tubes in series to raise total spark-over voltage to 100 V or higher. Such extinguishing of discharge once generated by the lightning surge and continued by the commercial power is referred to as "follow current interrupt". FIG. 3D shows the change of current flowing through a discharge tube when the discharge tube is used. In the case of a discharge tube, when voltage is high, current does not flow through the discharge tube; when current flows, voltage lowers. Consequently, instantaneous power (voltage× current) as well as energy (temporal integration of instantaneous power) are relatively small. Accordingly, in the case of a discharge tube, even when an extremely large current flows, its life is not adversely affected to a large extent.

Varistors and diodes being used as a clamping type overvoltage protective component are typically composed of a semiconductor. Accordingly, time $T_C$ taken for a clamping type overvoltage protective component to reach its operating voltage is as small as 0.01 μsec. On the other hand, discharge tube is based on a discharge phenomenon, so time $T_B$ taken to reach its operating voltage is 1 μsec, which is relatively long.

There have been proposed various methods for combination of both switching type components and clamping type components to reduce both the response time and the voltage across indoor side terminals simultaneously. For example, FIG. 4A shows a configuration which connects in parallel a discharge tube 911 and a varistor 901 and inserts a coil 961 therebetween. FIG. 4B shows the change of voltage across terminals of the discharge tube 911, and FIG. 4C shows the sum of currents flowing through the discharge tube 911 and the varistor 901, respectively, when voltage S (t) is applied across outdoor side terminals 962 and 963 in the exemplary configuration of FIG. 4A. In the varistor 901, it takes shorter time to reach the operating voltage compared to that of the discharge tube 911. Consequently, when voltage S (t) is applied to the outdoor side, current first flows through the varistor 901. At this time, a voltage is generated across both ends of the coil 961 by the change of current. Thereafter the voltage across both ends of the discharge tube 911 becomes higher than operating voltage B, whereby the discharge tube 911 is activated. By operating in this manner, in a short response time substantially equal to the time taken for the varistor, the voltage across indoor side terminals 964 and 965 can be lowered to the operating voltage of a varistor. Then the discharge tube is activated, whereby the voltage across indoor side terminals 964 and 965 can be lowered to spark-over voltage A of discharge tube. Any large current flows through the discharge tube 911, so the life of varistor is not affected. However, as the coil 961, a self-inductance value of about 10 μH is typically required. Further, at the time of normal operation, current from commercial power line flows through the coil, so it is needed to construct the coil with a wire having a large current capacity. Consequently, the size of the coil 961 becomes large, thus causing a problem in reducing the size and cost. In the case of an overvoltage protective device in a communication system, instead of a coil, a resistor can also be used. At the time of normal operation, however, signal current or power supply current flows through the resistor at all times, thus causing a problem of voltage drop. Further, when there is a deviation of resistance values of resistors inserted to each conductor, the degree of balance between the two conductors may be deteriorated.

FIG. 5A shows an exemplary configuration which connects in series a discharge tube 911 and a varistor 901. FIG. 5B shows the change of voltage across indoor side terminals 974 and 975, and FIG. 5C shows the change of current flowing through the discharge tube 911 and varistor 901, when voltage S (t) is applied across outdoor side terminals 972 and 973 in the exemplary configuration of FIG. 5A. Until the discharge tube 911 is activated, current does not flow through the varistor 901, so the voltage across both ends of the varistor 901 remains 0. More specifically, voltage S (t) across outdoor side terminals 972 and 973 is applied across both ends of the discharge tube 911. Accordingly, in this configuration, the operation occurs when operating voltage B of the discharge tube 911 is reached. After discharge is started, current flows through the varistor 901, so the sum of spark-over voltage A of the discharge tube 911 and operating voltage C of the varistor 901 is applied across indoor side terminals 974 and 975. In this exemplary configuration, the response time is the same as that of a discharge tube. Thus it takes longer for the operation to occur. Also, while voltage is high, the overall current flows through the varistor 901, thus causing a problem of adversely affecting the life of varistor. However, after the operations occur, voltage can be adjusted to C+A, thus enabling follow current interrupt, if C+A exceed the commercial power supply voltage.

FIG. 6A shows an exemplary configuration which arranges in parallel two identical discharge tubes, and FIG. 6B an exemplary configuration which connects in series two identical discharge tubes. Generally, discharge tubes have poor polarity symmetry. More specifically, the operating voltage varies according to which of both terminals is positive. The operating voltage when voltage having positive polarity is applied to the conductor 916 side of a discharge tube $911_i$ is referred to as $B_{i1}$, and the operating voltage when voltage having negative polarity is applied to the conductor 916 side is referred to as $B_{i2}$. When discharge tubes $911_1$ and $911_2$ are arranged in parallel as shown in FIG. 6A and voltage having positive polarity is applied to the conductor 916, the operating voltage is equal to the lower one of $B_{11}$ and $B_{21}$. When voltage having negative polarity is applied to the conductor 916, the operating voltage is equal to the lower one of $B_{12}$ and $B_{22}$. In the case of a overvoltage protective device using the discharge tube $911_1$ alone as an overvoltage protective device, the operating voltage is $B_{11}$ when voltage having positive polarity is applied to the conductor 916, and is $B_{12}$ when voltage having negative polarity is applied to the conductor 916. For example, when $B_{11} < B_{21} < B_{22} < B_{12}$, the operating voltages of FIG. 6A are $B_{11}$ and $B_{22}$. Accordingly, symmetry is improved compared to the operating voltages $B_{11}$ and $B_{12}$ when the discharge tube $911_1$ alone is used. When discharge tubes $911_3$ and $911_4$ are arranged in series as shown in FIG. 6B, again, if one having a lower operating voltage is activated, almost the entire voltage is applied to the other discharge tube, so the other discharge tube is also activated. More specifically, when discharge tubes are connected in series, again, symmetry can be improved. Even when a plurality of discharge tubes is arranged in parallel or in series, it is also possible that symmetry is not improved depending on a combination of operating voltages. In this case, however, symmetry is not deteriorated, and remains the same or is improved. Even combination of several discharge tubes without any varistors, the high response time cannot be achieved like as that of varistors.

FIG. 7 shows an example of overvoltage protective device for use in a communication system using a varistor and a three electrode discharge tube. In this overvoltage protective device, a sharp leading edge of lightning surge is absorbed by a varistor having a short response time and a low operating voltage. Subsequently, the three electrode discharge tube is activated by voltage drop caused by resistors 931 and 932, whereby a large part of lightning surge energy is absorbed. This is an example in which the configuration of FIG. 4A is improved in symmetry. When the above overvoltage protective device is used for an electric power system, the resistors 931 and 932 must be replaced with coils, thus causing a problem in reducing the size and cost.

Non-patent literature 1: "Earthing system and lightning protection," by Hitoshi Kijima, first edition, Corona Co., IEICE, Apr. 5, 2002, pp. 1-54

DISCLOSURE OF THE INVENTION

Problems to be Solved by the Invention

In order to reduce the maximum voltage generated when overvoltage is applied, there have hitherto been proposed various combinations of clamping type overvoltage protective components and discharge tubes. However, there has not been proposed any configuration which solves all problems about reducing the maximum voltage, reducing the size and cost, preventing overcurrent from flowing through a clamping type overvoltage protective component, securing symmetry, enabling follow current interrupt and the like.

Means to Solve Problems

Assume that n is an integer of 3 or more and i is an integer satisfying $1 \leq i < n/2$. A number n of discharge units ($E_1$, $E_2$, ..., $E_n$) are connected in series between two conductors. One terminal of a clamping type overvoltage protective unit $V_i$ is connected between the discharge units $E_i$ and $E_{i+1}$, and the other terminal of the clamping type overvoltage protective unit $V_1$ is connected to an external terminal in the discharge unit $E_n$ side. One terminal of a clamping type overvoltage protective unit $V_2$ is connected between the discharge units $E_{n-i}$ and $E_{n-i+1}$, and the other terminal of the clamping type overvoltage protective unit $V_2$ is connected to an external terminal in the discharge unit $E_1$ side. Here, the overall operating voltage of the discharge units $E_{i+1}$ to $E_{n-i}$ is set lower than a voltage obtained by subtracting from the operating voltage of the clamping type overvoltage protective unit $V_1$, the overall spark-over voltage of the discharge units $E_{n-i+1}$ to $E_n$, and lower than a voltage obtained by subtracting from the operating voltage of the clamping type overvoltage protective unit $V_2$, the overall spark-over voltage of the discharge units $E_1$ to $E_i$. Further, the overall operating voltage of the discharge units $E_{i+1}$ to $E_{n-i}$ is set higher than the overall operating voltage of the discharge units $E_1$ to $E_i$ and the overall operating voltage of the discharge units $E_{n-i+1}$ to $E_n$.

EFFECTS OF THE INVENTION

When an overvoltage having positive polarity S (t) is applied to an external terminal in the discharge unit $E_1$ side, almost the entire overvoltage thus applied is applied across the discharge units $E_1$ and $E_i$ and across the discharge units $E_{n-i+1}$ and $E_n$. Consequently, ones having a lower operating voltage from among the discharge units $E_1$ to $E_i$ and the discharge units $E_{n-i+1}$ to $E_n$ immediately start to discharge. In this manner, a high rate operation is possible, so overvoltage is not impressed into the apparatus in the indoor side. Thereafter, the other ones from among the discharge units $E_1$ to $E_i$ and the discharge units $E_{n-i+1}$ to $E_n$ also start to discharge. In this state, overcurrent flows through the clamping type overvoltage protective units $V_1$ and $V_2$. Thereafter, however, the discharge units $E_{i+1}$ to $E_{n-i}$ start to discharge. By virtue of this discharge, almost the entire overcurrent flows through the discharge units $E_1$ to $E_n$, so overcurrent is prevented from flowing through the clamping type overvoltage protective units $V_1$ and $V_2$. Also, in this method, coils and resistors are not used, thus enabling the reduction of size and cost. Further, the discharge units which are first activated are ones having a lower operating voltage from among the discharge units $E_1$ to $E_i$ and the discharge units $E_{n-i+1}$ to $E_n$, so it is easy to improve symmetry. The discharge units are arranged in series, so it is also easy to achieve follow current interrupt.

Thus, according to the configuration of the present invention, problems can simultaneously be solved about reducing the maximum voltage, reducing the size and cost, preventing overcurrent from flowing through a clamping type overvoltage protective component, securing symmetry, enabling follow current interrupt, and the like.

BRIEF DESCRIPTION OF THE DRAWINGS

FIG. 12 shows the voltages of each unit when all the discharge tubes are activated when voltage S (t) is applied across the outdoor side terminals;

FIG. 13A shows the change of voltage in a method of overvoltage protection according to First Embodiment;

FIG. 13B shows the change of current flowing between conductors in the method of overvoltage protection according to First Embodiment;

BEST MODES FOR CARRYING OUT THE INVENTION

Figure 1:
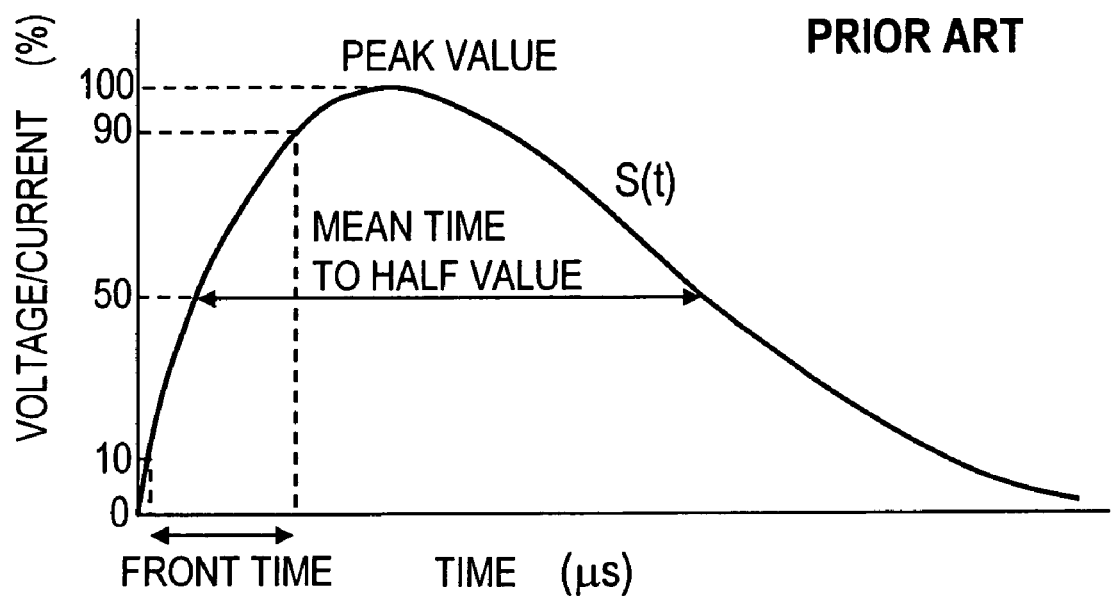
FIG. 1 shows the profile of voltage or current caused by lightning surge.
Figure 2A:
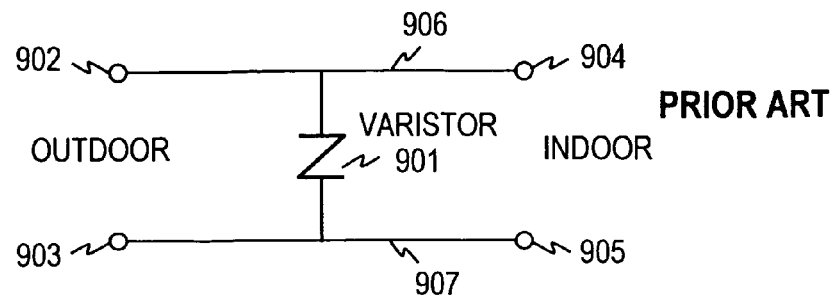
FIG. 2A shows a configuration for overvoltage protection using a varistor.
Figure 2B:
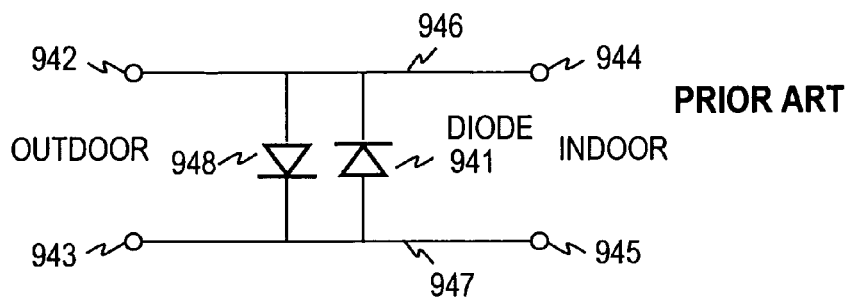
FIG. 2B shows a configuration for overvoltage protection using a diode.
Figure 2C:
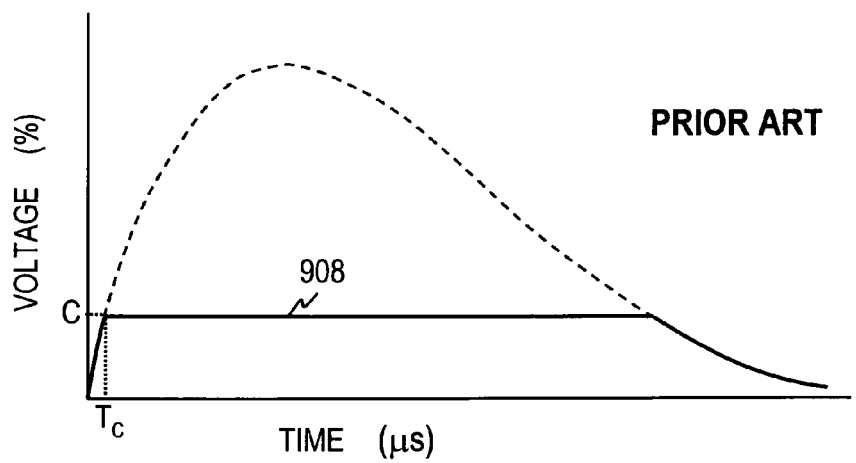
FIG. 2C shows an ideal change of voltage when a clamping type overvoltage protective component is used.
Figure 2D:
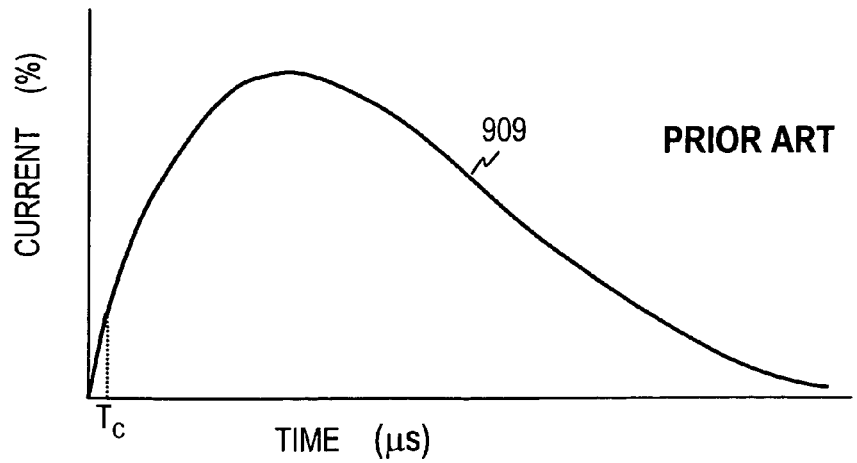
FIG. 2D shows the change of current flowing through a clamping type overvoltage protective component when the clamping type overvoltage protective component is used.
Figure 3A:
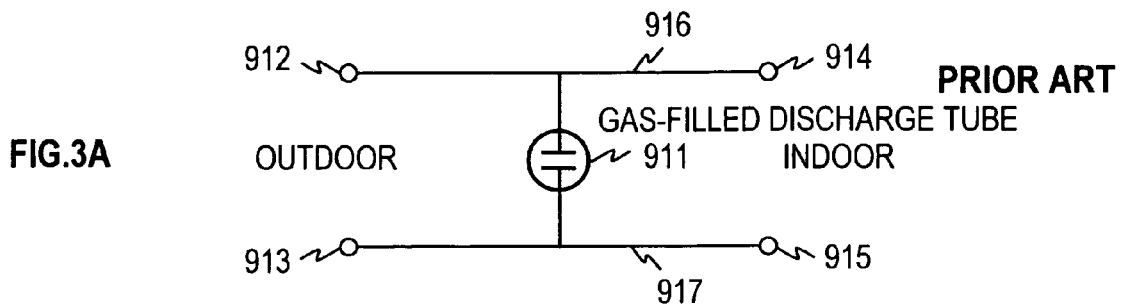
FIG. 3A shows a configuration for overvoltage protection using a gas-filled discharge tube.
Figure 3B:
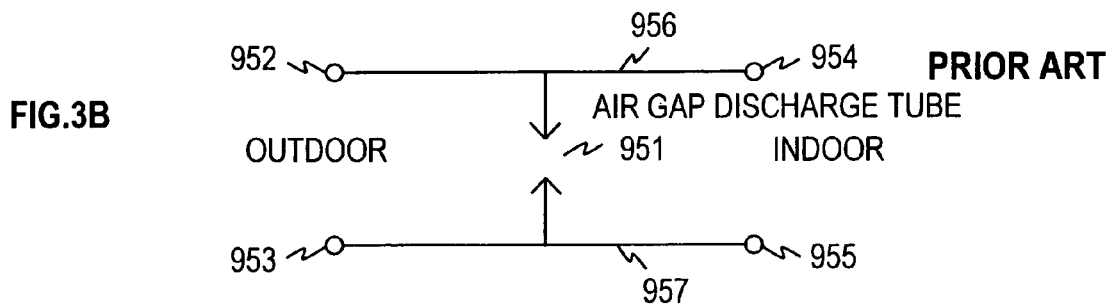
FIG. 3B shows a configuration for overvoltage protection using an air gap discharge tube.
Figure 3C:
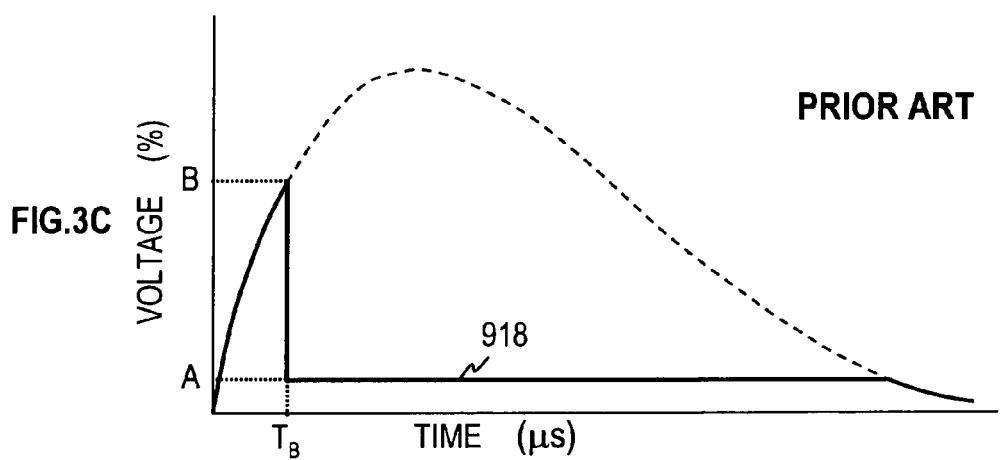
FIG. 3C shows an ideal change of voltage when a discharge tube is used.
Figure 3D:
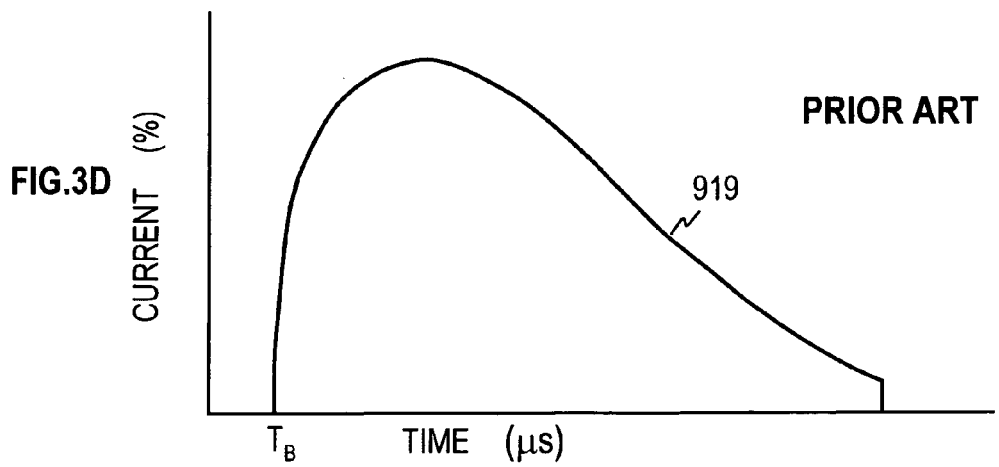
FIG. 3D shows the change of current flowing through a discharge tube when the discharge tube is used.
Figure 4A:
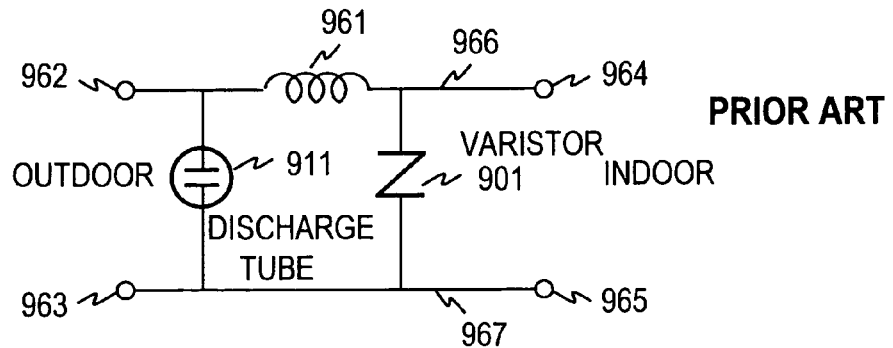
FIG. 4A shows an exemplary configuration which connects in parallel a discharge tube and a varistor and inserts a coil therebetween.
Figure 4B:
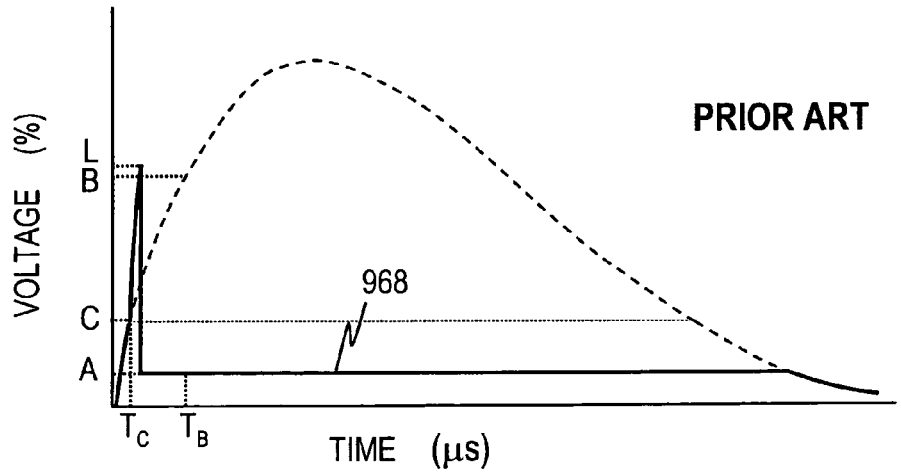
FIG. 4B shows the change of voltage across indoor side terminals when voltage S (t) is applied across outdoor side terminals.
Figure 4C:
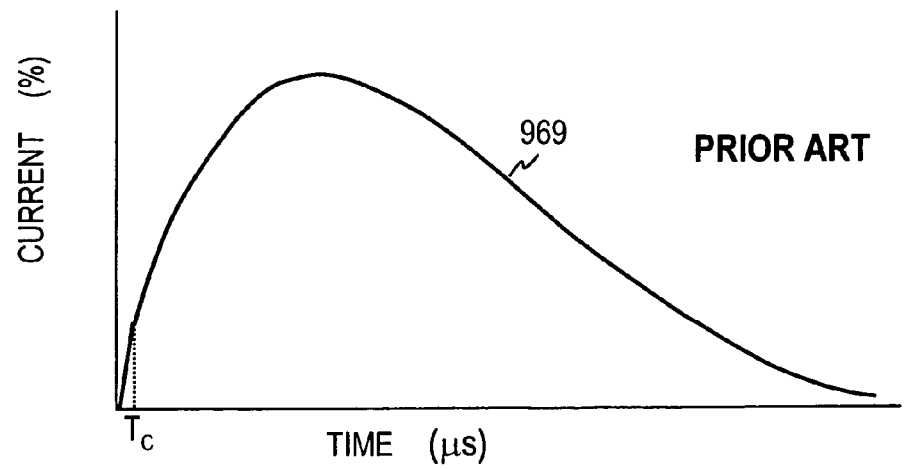
FIG. 4C shows the sum of currents flowing through the discharge tube and varistor, respectively, when voltage S (t) is applied across outdoor side terminals.
Figure 5A:
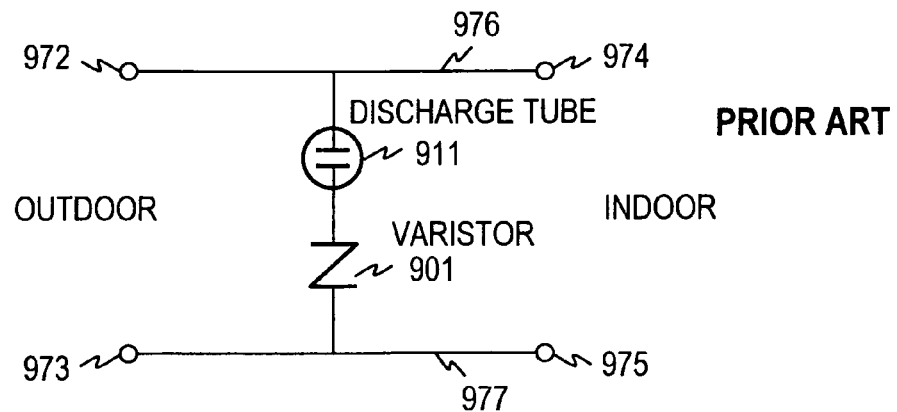
FIG. 5A shows an exemplary configuration which connects in series a discharge tube 911 and a varistor 901.
Figure 5B:
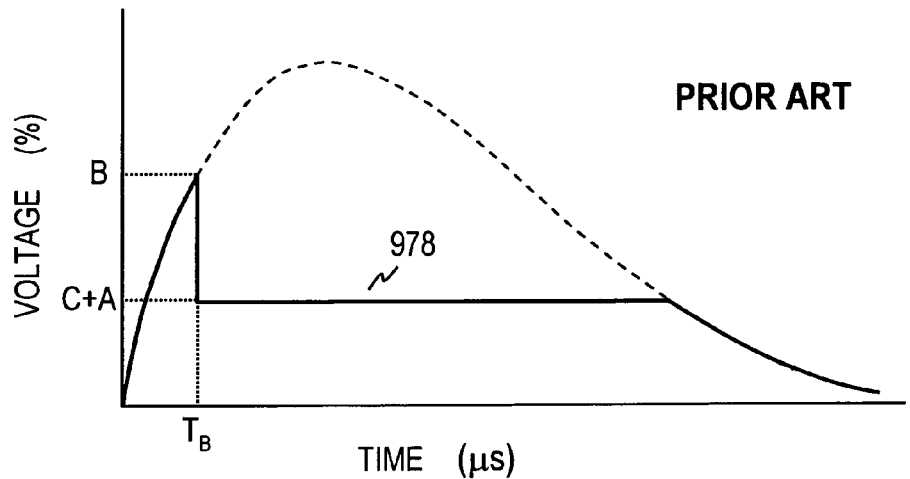
FIG. 5B shows the change of voltage across indoor side terminals when voltage S (t) is applied across outdoor side terminals.
Figure 5C:
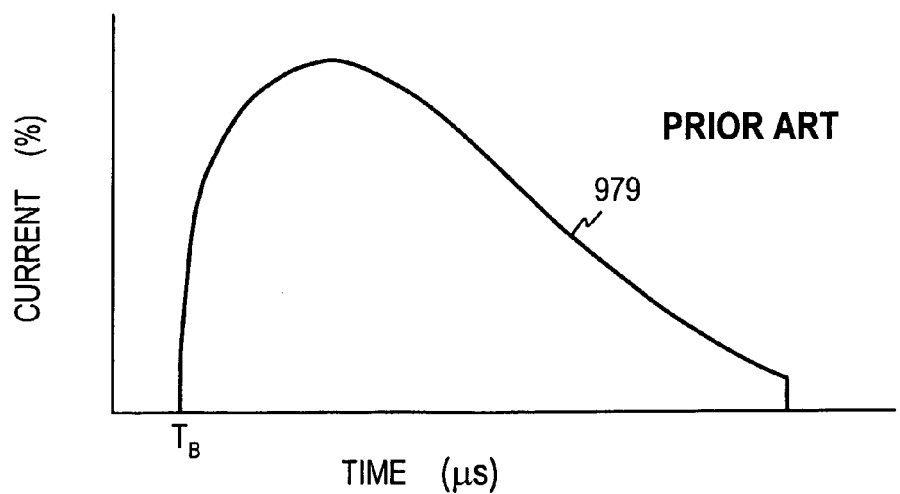
FIG. 5C shows the change of current flowing through the discharge tube and varistor when voltage S (t) is applied across outdoor side terminals.

The present invention will be described below. It is noted that the same reference numerals are applied to constituent units having the same function, and an explanation thereof is omitted.

First Embodiment

Figure 8:
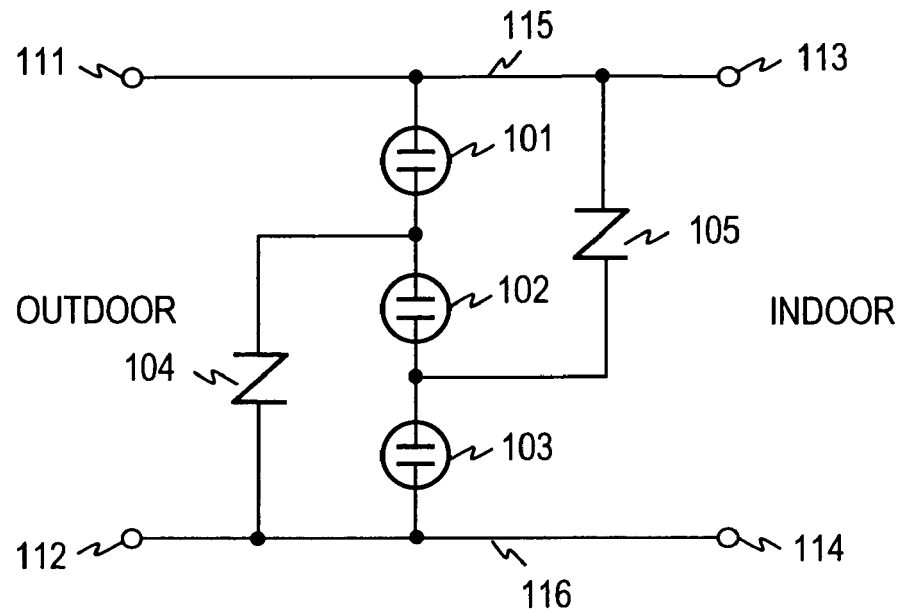
FIG. 8 shows a configuration of an overvoltage protective device according to First Embodiment.

FIG. 8 shows a configuration of an overvoltage protective device according to First Embodiment of the present invention. In the overvoltage protective device, three discharge units 101, 102 and 103, and two varistors 104 and 105 are used. As shown in FIG. 8, the three discharge units 101, 102 and 103 are connected in series between two conductors 115 and 116. The varistor 104 is connected in parallel to the two discharge units 102 and 103, excluding the discharge unit 101. The varistor 105 is connected in parallel to the two discharge units 101 and 102, excluding the discharge unit 103. Here, the operating voltage of the discharge unit 102 is set lower than a voltage obtained by subtracting the spark-over voltage of the discharge unit 103 from the operating voltage of the varistor 104, and lower than a voltage obtained by subtracting the spark-over voltage of the discharge unit 101 from the operating voltage of the varistor 105, and at the same time higher than the operating voltage of the discharge unit 101 and the operating voltage of the discharge unit 103. The varistors 104 and 105 each need not to be consisting of only one varistor, and several varistors connected in series or parallel may be used as the varistors 104 and 105.

Figure 9:
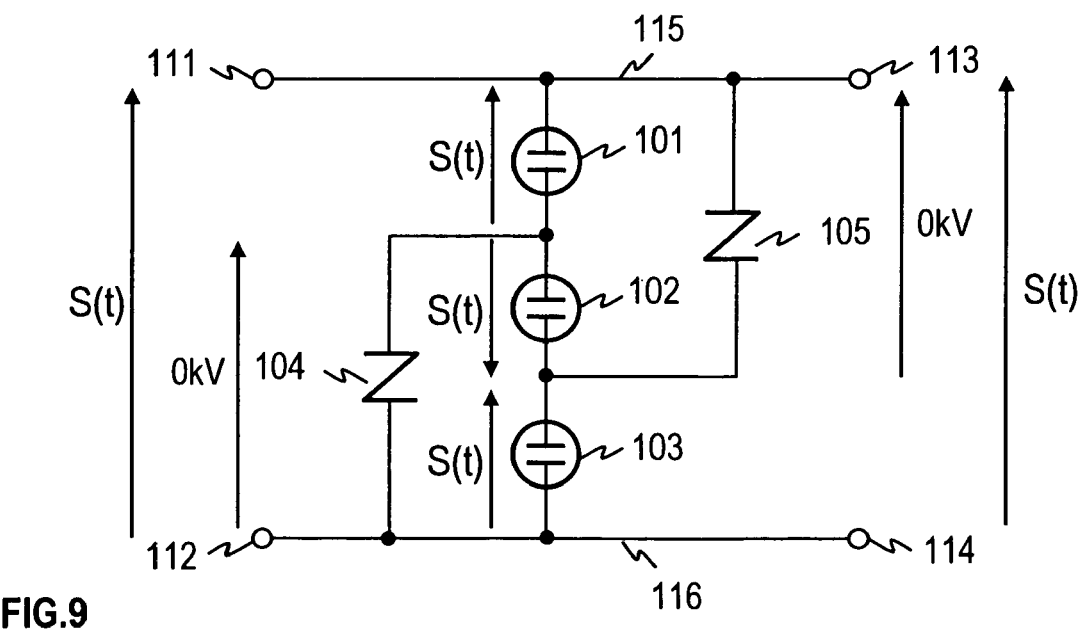
FIG. 9 shows the first-state voltage of each unit when voltage S (t) is applied across outdoor side terminals.

FIGS. 9 to 12 show the operations when overvoltage S (t) is applied across outdoor side terminals 111 and 112. Even when overvoltage S (t) is applied across outdoor side terminals 111 and 112, none of the discharge units 101, 102 and 103 discharges in a first state. At this time, current does not flow through the varistors 104 and 105. Accordingly, no potential difference is generated between both ends of the varistors 104 and 105. Consequently, voltage S (t) is applied to each discharge unit. This state is shown in FIG. 9. When the varistors 104 and 105 are not provided (i.e., when the discharge units alone are connected in series), approximately one-third the voltage of S (t) is applied to each discharge unit. More specifically, the varistors 104 and 105 serve to raise the voltage applied to each discharge unit, thereby enabling a high rate operation.

Figure 10:
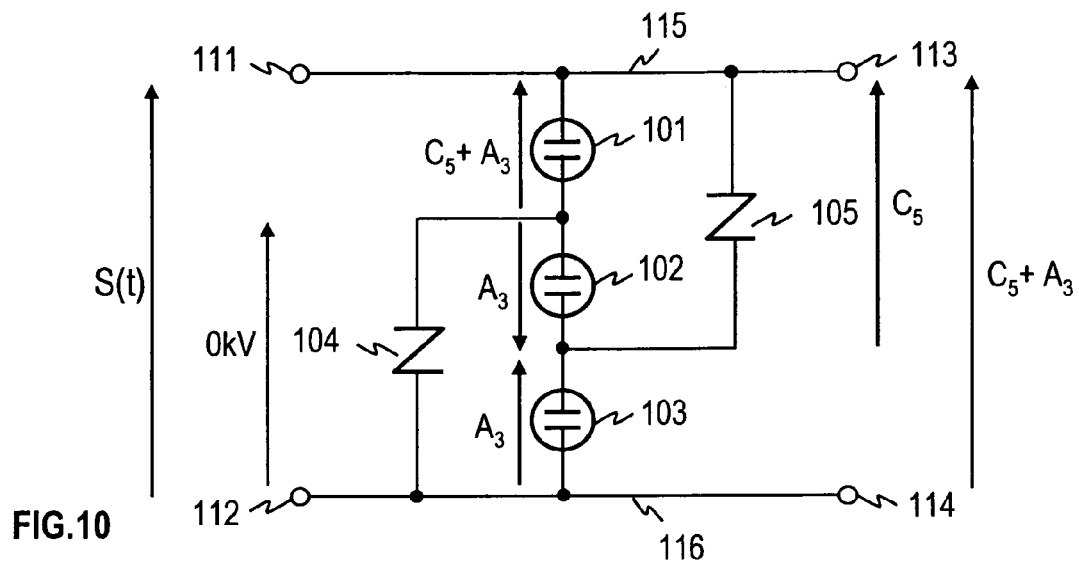
FIG. 10 shows the voltages of each unit when one discharge tube is activated when voltage S (t) is applied across the outdoor side terminals.

The operating voltage of the discharge unit 102 is set higher than that of the discharge units 101 and 103. Accordingly, the discharge unit 101 or the discharge unit 103 first discharges. For example, assume that the discharge unit 103 discharges. At this time, the spark-over voltage of the discharge unit 103 becomes $A_3$. Also, current flows through the varistor 105, so operating voltage $C_5$ of the varistor 105 is generated. Thus the voltage across indoor side terminals 113 and 114 becomes $C_5+A_3$. Current does not flow through the varistor 104, so no potential difference is generated between the terminals of the varistor 104. Consequently, each unit has potential difference as shown in FIG. 10.

Figure 11:
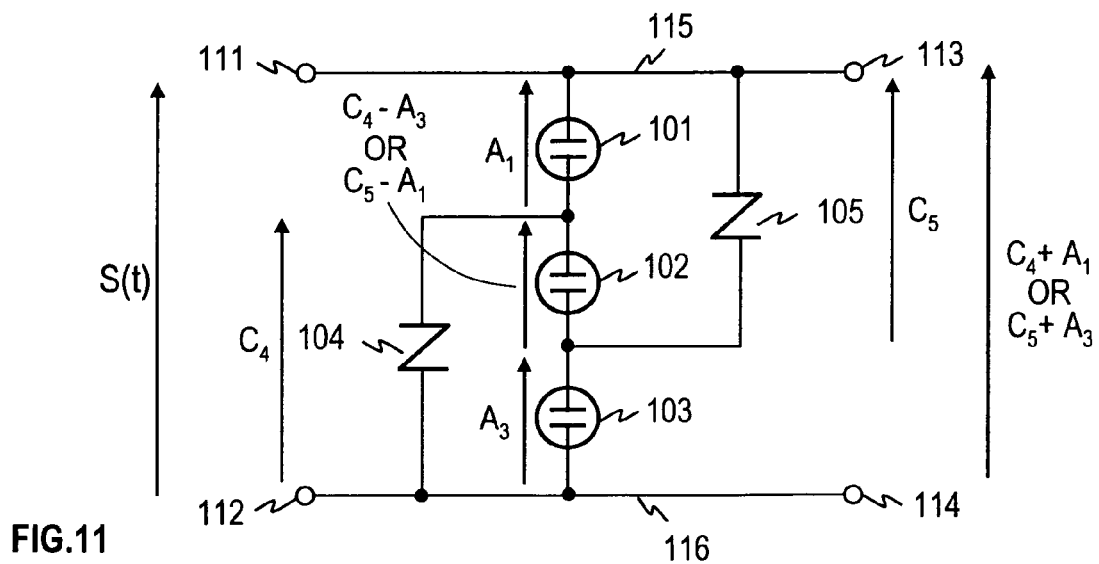
FIG. 11 shows the voltages of each unit when a second discharge tube is activated when voltage S (t) is applied across the outdoor side terminals.

The operating voltage of the discharge unit 101 is lower than that of the varistor 105, so the discharge unit 101 discharges. Once the discharge unit 101 discharges, current flows through the varistor 104, and operating voltage $C_4$ is generated. At this time, the voltage across indoor side terminals 113 and 114 is equal to the lower one of $C_4+A_1$ and $C_5+A_3$. It may be designed so that $C_4+A_1=C_5+A_3$. At this time, each unit has potential difference as shown in FIG. 11. The voltage applied to the discharge unit 102 is voltage $C_4-A_3$ obtained by subtracting spark-over voltage $A_3$ of the discharge unit 103 from operating voltage $C_4$ of the varistor 104, or voltage $C_5-A_1$ obtained by subtracting spark-over voltage $A_1$ of the discharge unit 101 from operating voltage $C_5$ of the varistor 105.

The operating voltage of the discharge unit 102 is lower than voltage $C_4-A_3$ obtained by subtracting spark-over voltage $A_3$ of the discharge unit 103 from operating voltage $C_4$ of the varistor 104, and lower than voltage $C_5-A_1$ obtained by subtracting spark-over voltage $A_1$ of the discharge unit 101 from operating voltage $C_5$ of the varistor 105. Thus the discharge unit 102 also discharges. Potential differences of each unit in this state are shown in FIG. 12. In such state, almost the entire overcurrent can be made to flow through the discharge units. When the overall spark-over voltage $A_1+A_2+A_3$ is set higher than the commercial power source (100 V, for example), the problem of follow current interrupt can be also solved. Also, in this configuration, coils and resistors are not used, so it is possible to reduce the size and cost, and a problem of the degree of balance between two conductors does not arise. Practically, the operations of FIGS. 9 to 12 are performed in a significantly short time period. Thus the voltage across indoor side terminals 113 and 114 varies as shown in FIG. 13A. Reference character B in FIG. 13A indicates an operating voltage when the discharge units 101, 102 and 103 alone are connected in series (i.e., when the varistors 104 and 105 are not provided). As described above, by virtue of provision of the varistors 104 and 105, the operating voltage can be lowered to B' (the operating voltage of the discharge unit 101 or the discharge unit 103 alone). Consequently, a high rate operation is possible and the maximum voltage can be lowered. FIG. 13B shows the change of current flowing between the conductors 115 and 116. In this configuration, with voltage lowered, almost the entire current can be made to flow through the discharge units 101, 102 and 103, so a problem of life of varistor does not arise.

The overvoltage protective device according to the present embodiment operates as described above when overvoltage S (t) is higher than $C_4+A_1$ and $C_5+A_3$. However, there may be a case where such voltage is not applied; for example, the maximum value of S (t) is higher than $B_3$ but lower than $C_5+A_3$. In this case, it is possible that the operation reaches the state shown in FIG. 10 or the state shown in FIG. 11 but the operation does not reach the state shown in FIG. 12. If the operation does not proceed to the state shown in FIG. 12, current continues to flow through the varistor. However, this is a phenomenon occurring when overvoltage S (t) is relatively low, so a problem of life of varistor does not arise.

Figure 6A:
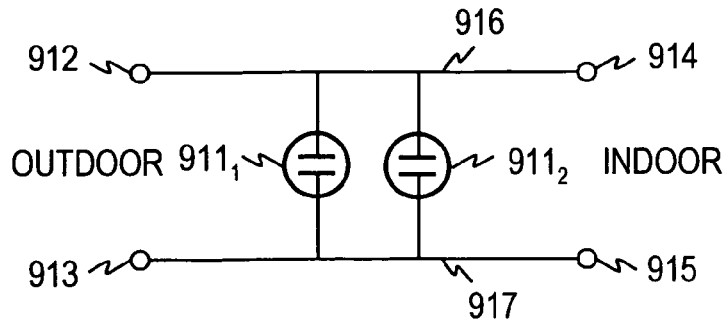
FIG. 6A shows an exemplary configuration which arranges in parallel two identical discharge tubes.
Figure 6B:
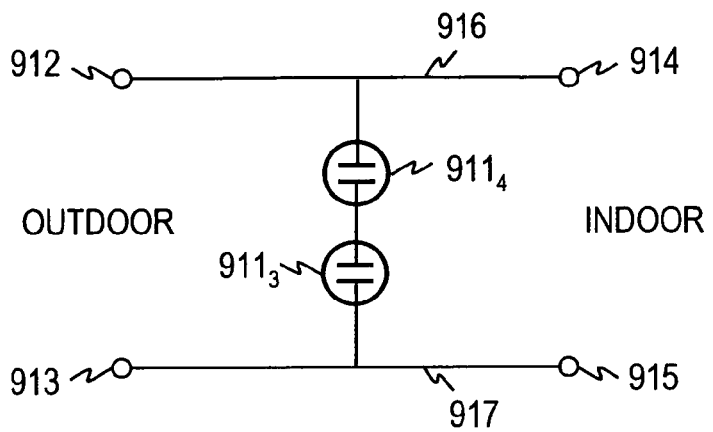
FIG. 6B shows an exemplary configuration which arranges in series two identical discharge tubes.
Figure 7:
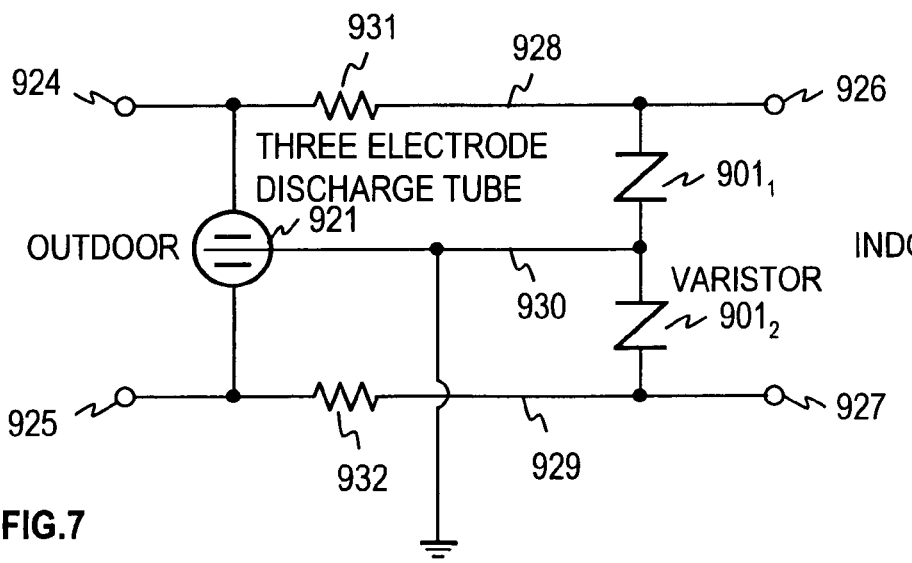
FIG. 7 shows an example of overvoltage protective device using varistors and a three electrode discharge tube.

When an overvoltage having negative polarity S (t) relative to outdoor side terminal 112 is applied to the terminal 111, again, one having a lower operating voltage from among the discharge units 101 and 103 is activated. If the discharge units 101 and 103 are designed to have the same operating voltage, symmetry can be improved as described in FIG. 6B. If the discharge units 101 and 103 are designed so that either of them has a lower operating voltage, a discharge unit which first discharges can be selected. When the discharge unit which first discharges is selected, the improvement in symmetry of the overvoltage protective device cannot be expected without improving symmetry of positive and negative polarities relative to lightning surge of the discharge unit itself. The degree of symmetry needed differs depending on application, and thus it may be designed in consideration of the characteristics and application of components used.

The features of the present invention are summarized as follows. According to the present invention, three or more discharge units are connected in series between two conductors. Further, two or more clamping type overvoltage protective units are connected in parallel to the discharge units except one or more of the discharge units. Herein, the overall operating voltage of the discharge units connected in parallel to all the clamping type overvoltage protective units is set lower than any voltage obtained by subtracting from the operating voltage of each clamping type overvoltage protective unit, the spark-over voltages of the other discharge units connected in parallel to the clamping type overvoltage protective unit. Also, the overall operating voltage of the discharge units connected in parallel to all the clamping type overvoltage protective units is set higher than the operating voltage of each discharge unit connected in series to any one of the clamping type overvoltage protective units. A variation according to the above idea will be described below.

[Variation 1]

Figure 14:
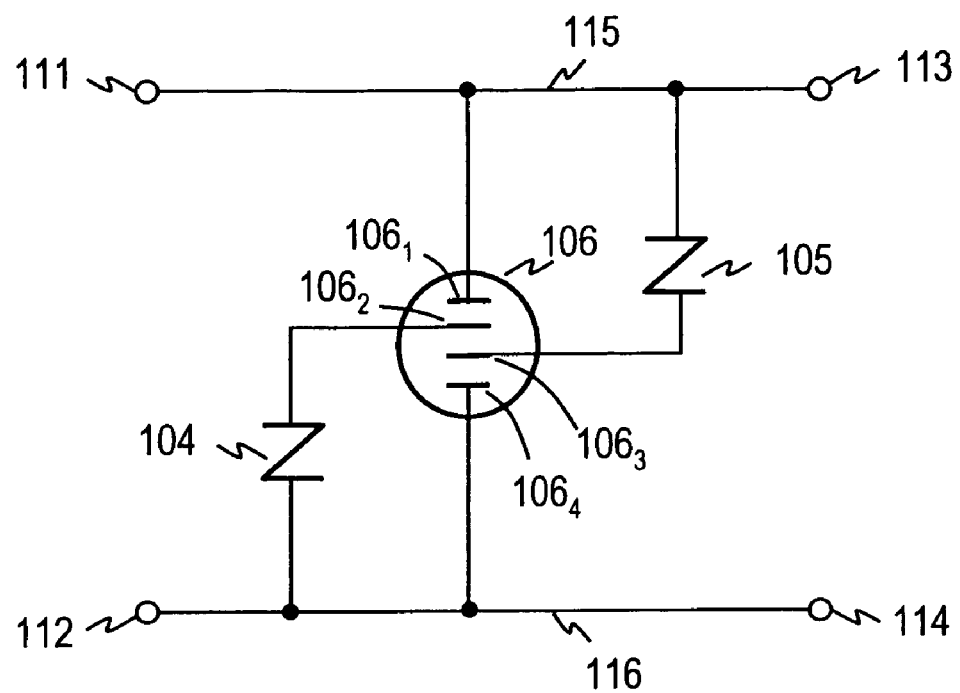
FIG. 14 shows a variation in which four electrodes are arranged within one discharge tube to provide three discharge units.

FIG. 14 shows an example in which four electrodes $106_1$, to $106_4$ are arranged within one discharge tube 106 to provide three discharge units. In the present variation, the electrodes $106_1$, and $106_2$ correspond to the discharge unit 101, the electrodes $106_2$ and $106_3$ correspond to the discharge unit 102, and the electrodes $106_3$ and $106_4$ correspond to the discharge unit 103. The operation of the present variation is the same as that of First Embodiment.

[Variation 2]

Figure 15:
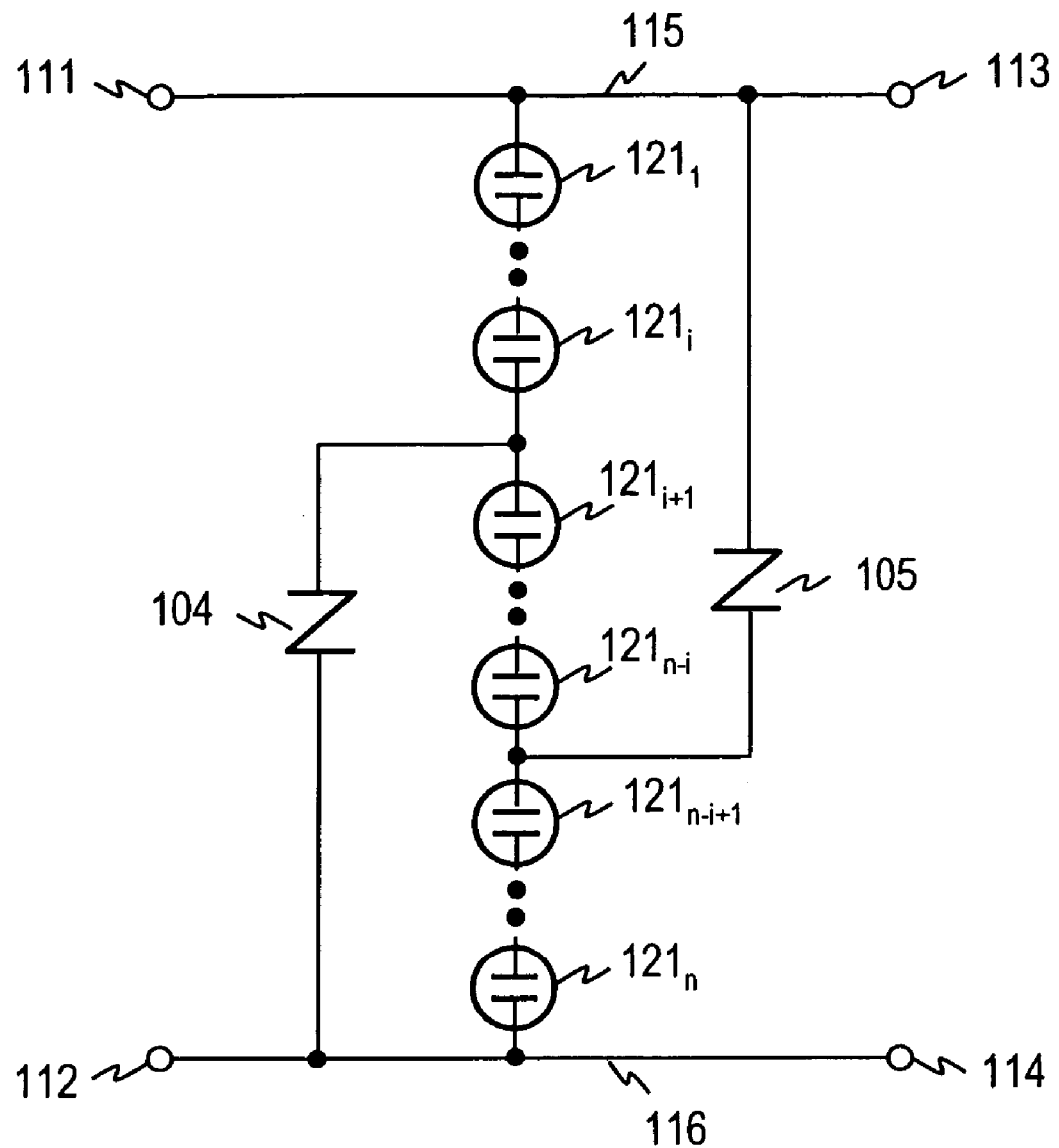
FIG. 15 shows a variation in which a number n of discharge units are connected in series.

FIG. 15 shows an example in which a number n of discharge units are connected in series. Herein, n is an integer of 3 or more and i is an integer satisfying $1 \leq i < n/2$. A number n of discharge units $121_1, 121_2, \ldots, 121_n$ are connected in series between two conductors 115 and 116. One terminal of a varistor 104 is connected between the discharge units $121_i$ and $121_{i+1}$, and the other terminal of the varistor 104 is made conductive to the conductor 116 in the discharge unit $121_n$ side. One terminal of a varistor 105 is connected between the discharge units $121_{n-i}$ and $121_{n-i+1}$, and the other terminal of the varistor 105 is made conductive to the conductor 115 in the discharge unit $121_1$ side. Further, the overall operating voltage $B_{i+1 \, to \, n-i}$ of the discharge units $121_{i+1}$ to $121_{n-i}$ is set lower than a voltage obtained by subtracting from operating voltage $C_1$ of the varistor 104, the overall spark-over voltage $A_{n-i+1 \, to \, n}$ of the discharge units $121_{n-i+1}$ to $121_n$, and set lower than a voltage obtained by subtracting from operating voltage $C_2$ of the varistor 105, the overall spark-over voltage $A_{1 \, to \, i}$ of the discharge units $121_1$ to $121_i$, and the overall operating voltage $B_{i+1 \, to \, n-i}$ of the discharge units $121_{i+1}$ to $121_{n-i}$ is set higher than the overall operating voltage $B_{1 \, to \, i}$ of the discharge units $121_1$ to $121_i$ and the overall operating voltage $B_{n-i+1 \, to \, n}$ of the discharge units $121_{n-i+1}$ to $121_n$. The varistors 104 and 105 each need not to be consisting of only one varistor, and several varistors connected in series or parallel may be used as the varistors 104 and 105.

In the present variation, the discharge units $121_1$ to $121_i$ correspond to the discharge unit 101, the discharge units $121_{i+1}$ to $121_{n-i}$ correspond to the discharge unit 102, and the discharge units $121_{n-i+1}$ to $121_n$ correspond to the discharge unit 103. The operation of the present variation is also the same as that of First Embodiment.

In the present embodiment, again, instead of connecting in series individual discharge units, a number n+1 of electrodes may be arranged within one discharge tube to construct a number n of discharge units.

[Variation 3]

Figure 16A:
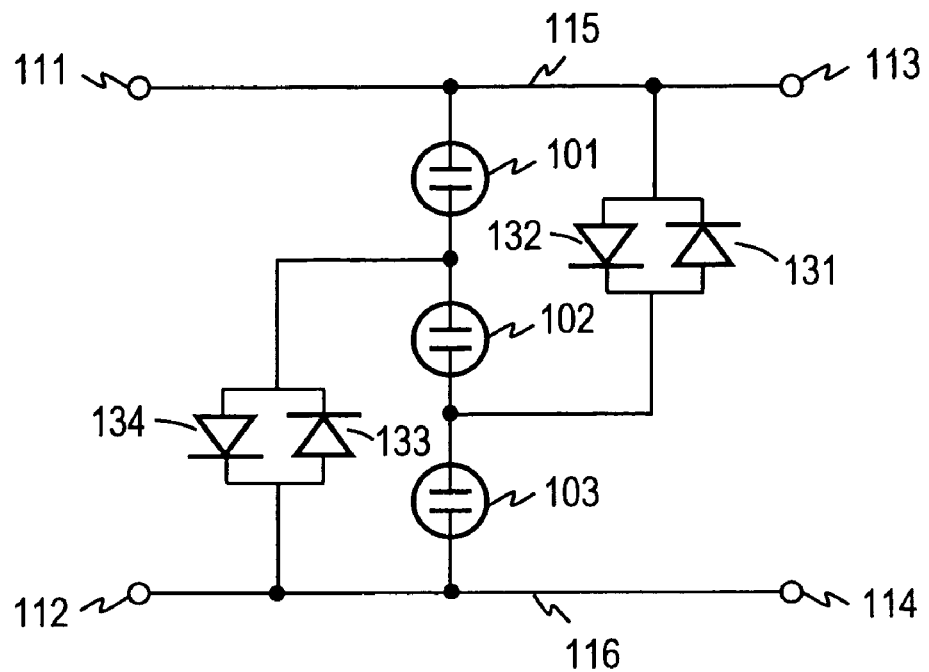
FIG. 16A shows an exemplary configuration which uses a forward characteristic of the diode in voltage limiting instead of a varistor.
Figure 16B:
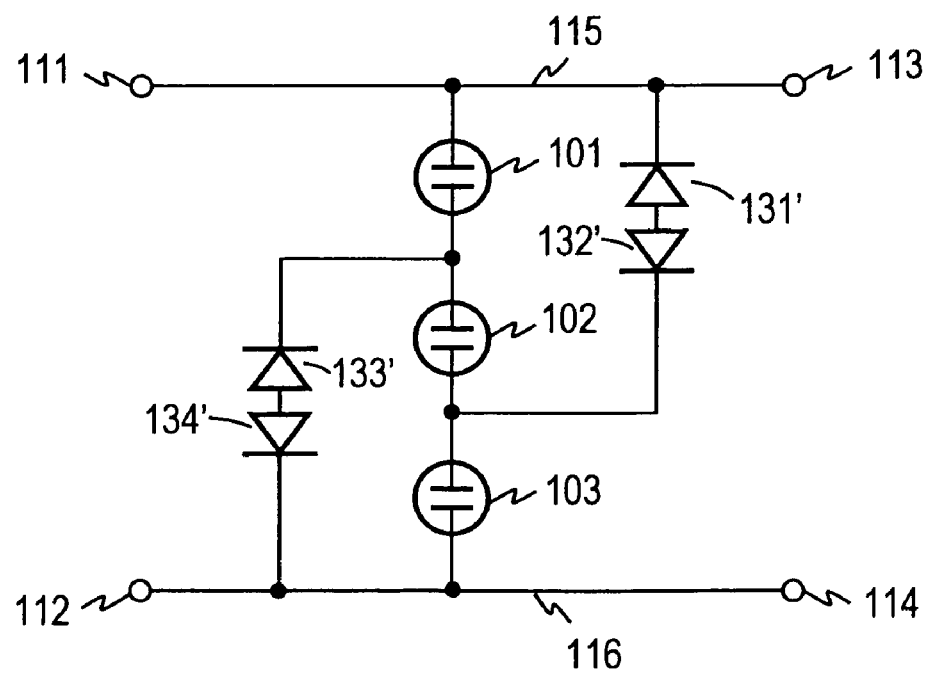
FIG. 16B shows an exemplary configuration which uses a reverse characteristic thereof in voltage limiting instead of a varistor.

FIGS. 16A and 16B show an exemplary configuration which uses a diode instead of a varistor. Diode has polarity, so two diodes are used as a pair. FIG. 16A shows an exemplary configuration which uses a forward characteristic of the diode in voltage limiting. FIG. 16B shows an exemplary configuration which uses a reverse characteristic thereof in voltage limiting. Similarly to varistor, diode is also a clamping type overvoltage protective component. Accordingly, the operation of the present variation is also the same as that of First Embodiment. In FIGS. 16A and 16B, two diodes are used as a pair, but a chip with two integrated diodes may be used. Alternatively, several diodes may be used in parallel or series.

[Variation 4]

Figure 17:
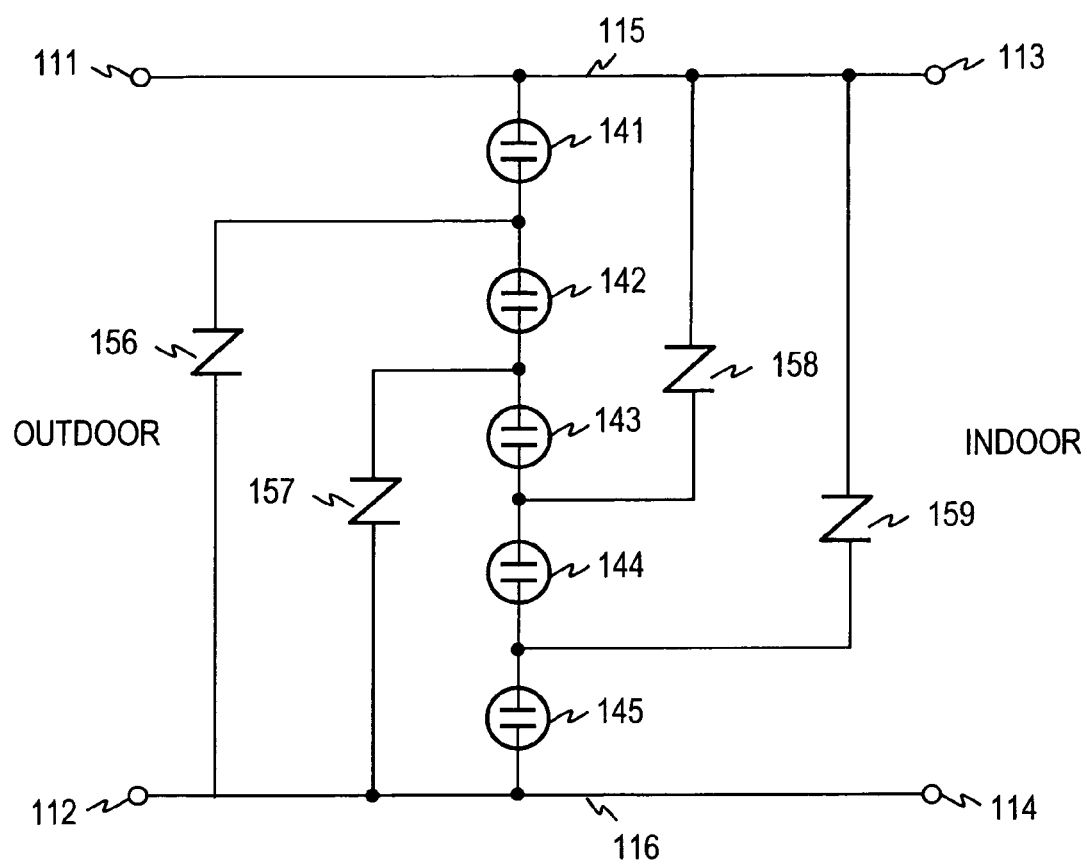
FIG. 17 shows a variation which connects in series five discharge units and uses four varistors.

FIG. 17 shows a variation which connects in series five discharge units and uses four varistors. In this configuration, discharge units 141 to 145 are connected in series. Terminals of a varistor 156 are connected between the discharge units 141 and 142, and to a conductor 116, respectively. Terminals of a varistor 157 are connected between the discharge units 142 and 143, and to a conductor 116, respectively. Terminals of a varistor 158 are connected between the discharge units 143 and 144, and to a conductor 115, respectively. Terminals of a varistor 159 are connected between the discharge units 144 and 145, and to a conductor 115, respectively. Here, assume that the operating voltage of the discharge unit n (n=141 to 145) is $B_n$, the spark-over voltage is $A_n$, and the operating voltage of the varistor m (m=156 to 159) is $C_m$. The operating voltage $B_{143}$ of the discharge unit 143 is set so as to satisfy the following condition.

$B_{143} < C_{156} - A_{142} - A_{144} - A_{145}$
$B_{143} < C_{157} - A_{144} - A_{145}$
$B_{143} < C_{158} - A_{141} - A_{142}$
$B_{143} < C_{159} - A_{141} - A_{142} - A_{144}$
$B_{143} > B_{141}$
$B_{143} > B_{142}$
$B_{143} > B_{144}$
$B_{143} > B_{145}$

The above condition is described as follows; the operating voltage of a discharge unit connected in parallel to all varistors is set lower than any voltage obtained by subtracting from the operating voltage of each varistor, the spark-over voltages of the other discharge units connected in parallel to the varistor. Also, the operating voltage of a discharge unit connected in parallel to all varistors is set higher than the operating voltage of each discharge unit connected in series to any one of the varistors.

When the above setting is given, while overvoltage is concentrated to discharge units to be activated, discharge can be sequentially started. This operation is similar to that of First Embodiment. Accordingly, all the discharge units can be activated unfailingly and in a short time period. In order to improve the symmetry of the entire overvoltage protective device, the following setting is required; $B_{141} = B_{145}$, $B_{142} = B_{144}$, $C_{156} = C_{159}$, and $C_{157} = C_{158}$. Further, in order to activate the discharge units unfailingly in order of being closer to the conductor, the following setting is required; $B_{141} < B_{144}$ and $B_{145} < B_{142}$. Herein, "activate the discharge units unfailingly in order of being closer to the conductor" means that the discharge units 141 and 145 are first activated, and thereafter the discharge units 142 and 144 are activated, and finally the discharge unit 143 is activated.

[Variation 5]

Figure 18:
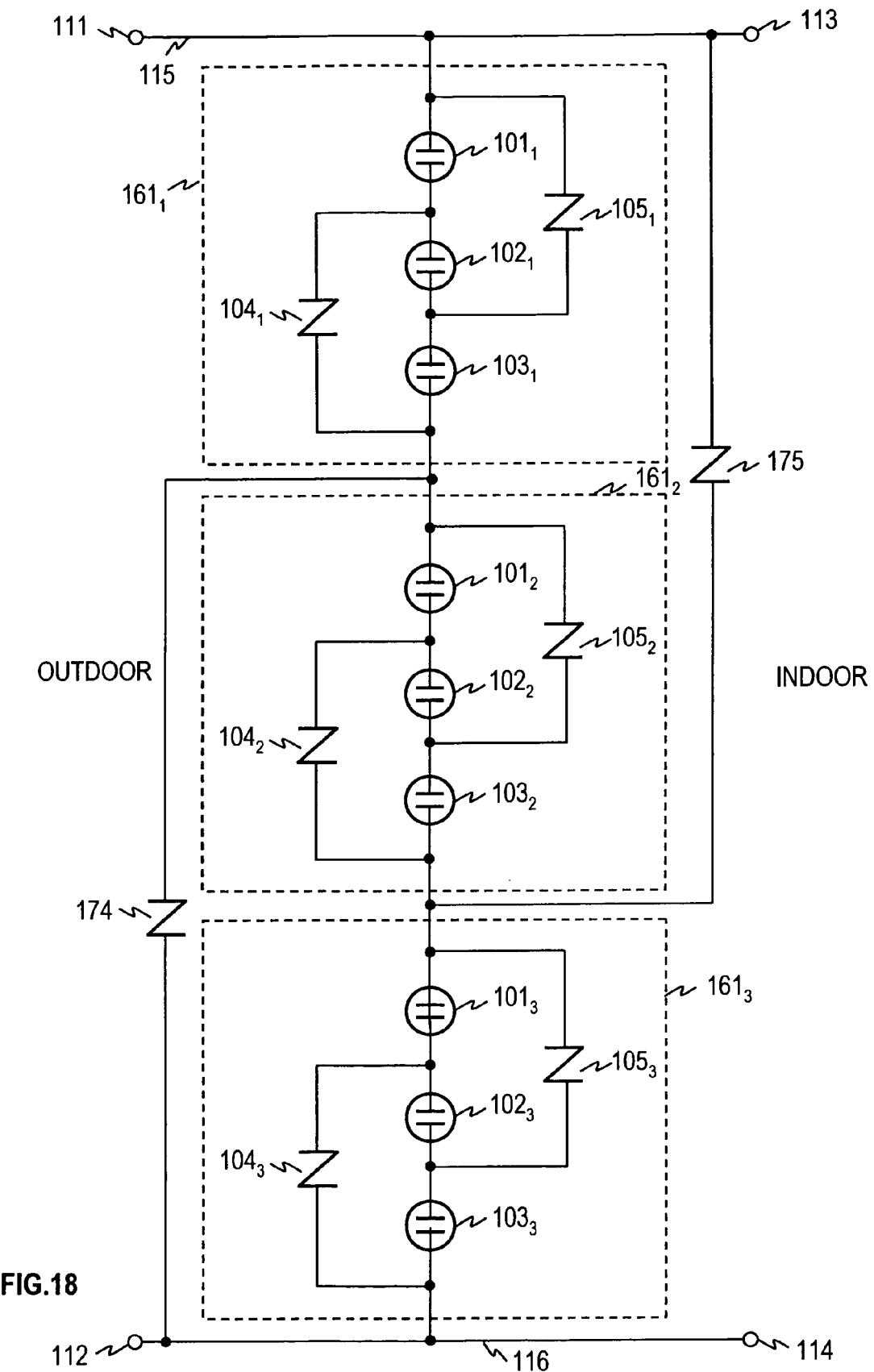
FIG. 18 shows a variation in which the configuration shown in FIG. 8 is used as one discharge unit.

FIG. 18 shows a variation in which the overvoltage protective device according to the first embodiment (FIG. 8) is used as one discharge unit. A discharge unit $161_i$ (i=1 to 3) has the same configuration as the overvoltage protective device in FIG. 8, and includes discharge units $101_i$, $102_i$ and $103_i$, and varistors $104_i$ and $105_i$. Thus, one discharge unit needs not to include one discharge tube, and may include a combination of a discharge tube and a clamping type overvoltage protective component. In FIG. 18, a discharge unit connected in parallel to all clamping type overvoltage protective units is a discharge unit $161_2$. In order to obtain the advantages of the present invention with this structure, the following two conditions may be satisfied as mentioned above. First, the operating voltage of the discharge unit $161_2$ is set lower than a voltage obtained by subtracting the spark-over voltage of a discharge unit $161_3$ from the operating voltage of a varistor 174, and lower than a voltage obtained by subtracting the spark-over voltage of a discharge unit $161_1$ from the operating voltage of a varistor 175. Second, the operating voltage of the discharge unit $161_2$ is set higher than the operating voltage of the discharge unit $161_1$ and the operating voltage of the discharge unit $161_3$. If these two conditions are satisfied, the operations become the same as in the description with reference to FIGS. 9 to 12, and the advantages of the present invention can be achieved. The operating voltage of the discharge unit $161_i$ is a lower one of the operating voltage of the discharge unit $101_i$ and the operating voltage of the discharge unit $103_i$. The overall spark-over voltage of the discharge unit $161_i$ is the sum of the spark-over voltage of the discharge unit $101_i$, the spark-over voltage of the discharge unit $102_i$, and the spark-over voltage of the discharge unit $103_i$.

Second Embodiment

Figure 19:
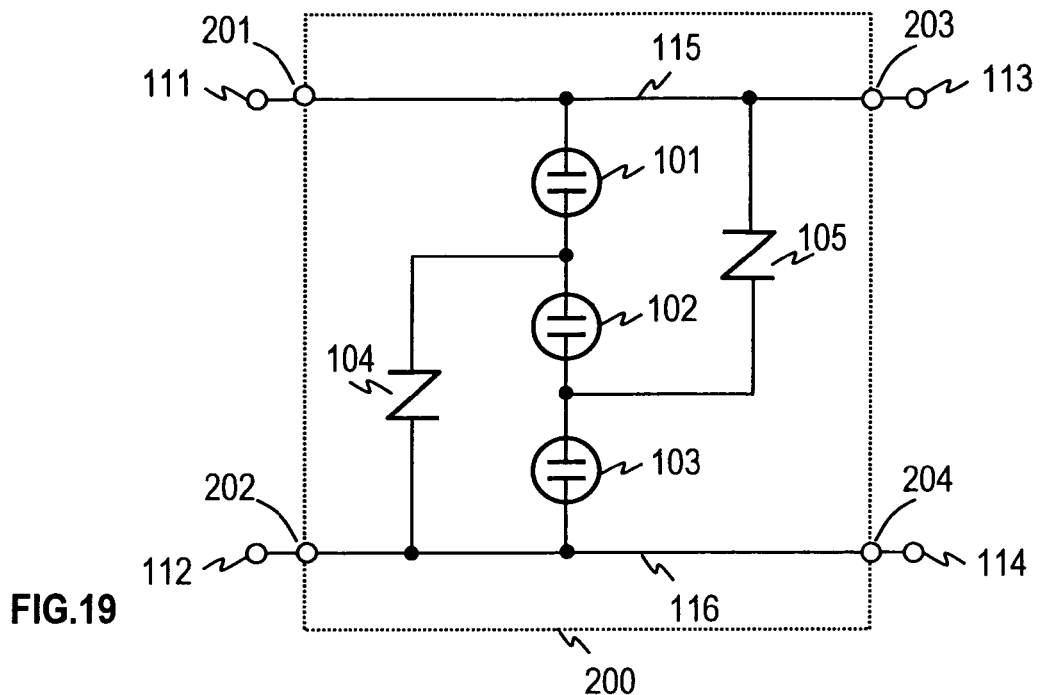
FIG. 19 shows an exemplary configuration of an overvoltage protective device.

In the present embodiment, there is described a configuration of an overvoltage protective device implementing the method of overvoltage protection described in First Embodiment. FIG. 19 shows a configuration of an overvoltage protective device 200. The overvoltage protective device 200 has four external terminals 201, 202, 203 and 204. The external terminals 201 and 202 are connected to the outdoor side conductors, and the external terminals 203 and 204 are connected to the indoor side (the apparatus side to be protected).

[Variation 1]

Figure 20:
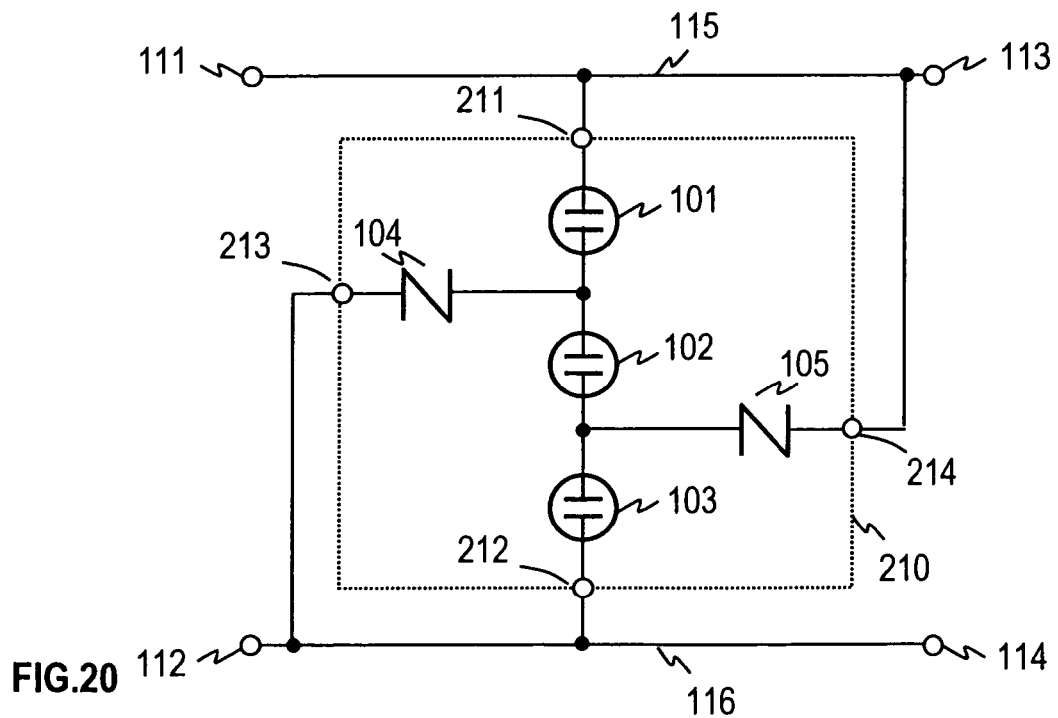
FIG. 20 shows a variation of overvoltage protective device.

FIG. 20 shows a variation of overvoltage protective device. According to the present variation, the overvoltage protective device 210 has four external terminals 211, 212, 213 and 214. The external terminals 211 and 214 are connected to one conductor 115, and the external terminals 212 and 213 are connected to the other conductor 116.

[Variation 2]

Figure 21:
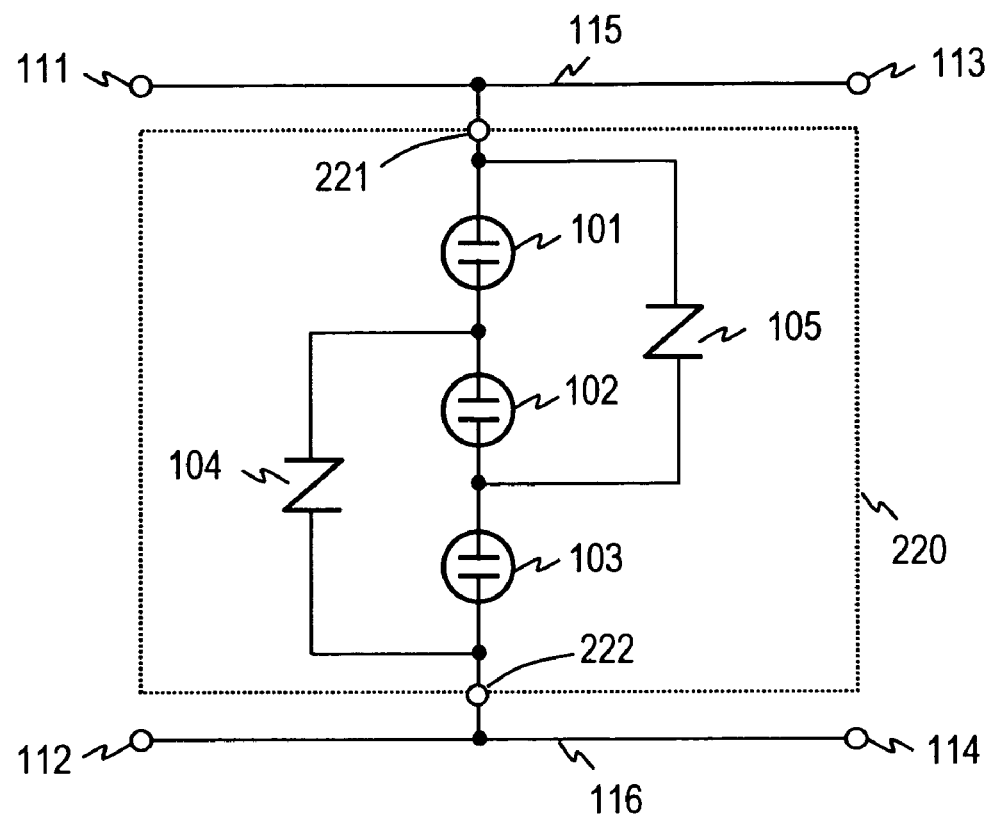
FIG. 21 shows an exemplary configuration of an overvoltage protective device having two external terminals.

FIG. 21 shows another variation of overvoltage protective device. According to the present variation, one terminal of a varistor 104 is made conductive to a discharge unit 103, within an overvoltage protective device 220. One terminal of a varistor 105 is also made conductive to a discharge unit 101, within the overvoltage protective device 220. Accordingly, the overvoltage protective device 220 has two external terminals 221 and 222. The external terminal 221 is connected to one conductor, and the external terminal 222 to the other conductor.

What is claimed is:

1. An overvoltage protective device with one or more discharge tubes and one or more clamping type overvoltage protective components, the overvoltage protective device comprising:
   three or more discharge units connected in series; and
   two or more clamping type overvoltage protective units connected in parallel to the discharge units except one or more of the discharge units, wherein the overall operating voltage of the discharge units connected in parallel to all the clamping type overvoltage protective units is lower than any voltage obtained by subtracting from the operating voltage of each clamping type overvoltage protective unit, the spark-over voltages of the other discharge units connected in parallel to the clamping type overvoltage protective unit, and at the same time higher than the operating voltage of each discharge unit connected in series to any one of the clamping type overvoltage protective units.

2. The overvoltage protective device according to claim 1, wherein the discharge unit comprises a discharge tube and a clamping type overvoltage protective component.

3. The overvoltage protective device according to claim 2, wherein the discharge unit comprises:
   three or more discharge tubes connected in series; and
   two or more clamping type overvoltage protective components connected in parallel to the discharge tubes except one or more discharge tubes, wherein the overall operating voltage of the discharge tubes connected in parallel to all the clamping type overvoltage protective components is lower than any voltage obtained by subtracting from the operating voltage of each clamping type overvoltage protective component, the spark-over voltage of the other discharge tubes connected in parallel to the clamping type overvoltage protective component, and at the same time higher than the operating voltage of each discharge tube connected in series to any one of the clamping type overvoltage protective components.

4. An overvoltage protective device with one or more discharge tubes and one or more clamping type overvoltage protective components, the overvoltage protective device comprising:
   a number n of discharge units ($E_1, E_2, \ldots, E_n$) connected in series;
   a clamping type overvoltage protective unit $V_1$ of which one terminal is connected between the discharge units $E_i$ and $E_{i+1}$; and
   a clamping type overvoltage protective unit $V_2$ of which one terminal is connected between the discharge units $E_{n-i}$ and $E_{n-i+1}$, where n is an integer of 3 or more and i is an integer satisfying $1 \leq i < n/2$, wherein the overall operating voltage of the discharge units $E_{i+1}$ to $E_{n-i}$ is lower than a voltage obtained by subtracting from the operating voltage of the clamping type overvoltage protective unit $V_1$, the overall spark-over voltage of the discharge units $E_{n-i+1}$ to $E_n$, and a voltage obtained by subtracting from the operating voltage of the clamping type overvoltage protective unit $V_2$, the overall spark-over voltage of the discharge units $E_1$ to $E_i$, and at the same time higher than the overall operating voltage of the discharge units $E_1$ to $E_i$ and the overall operating voltage of the discharge units $E_{n-i+1}$ to $E_n$.

5. The overvoltage protective device according to claim 4, wherein one terminal of the clamping type overvoltage protective unit $V_1$ is made conductive to an external terminal in the discharge unit $E_n$ side, and one terminal of the clamping type overvoltage protective unit $V_2$ is made conductive to an external terminal in the discharge unit $E_1$ side.

6. The overvoltage protective device according to claim 4, wherein n=3, and i=1.

7. The overvoltage protective device according to claim 4, wherein the discharge unit comprises a discharge tube and a clamping type overvoltage protective component.

8. The overvoltage protective device according to claim 7, wherein the discharge unit comprises:
   three or more discharge tubes connected in series; and
   two or more clamping type overvoltage protective components connected in parallel to the discharge tubes except one or more discharge tubes, wherein the overall operating voltage of the discharge tubes connected in parallel to all the clamping type overvoltage protective components is lower than any voltage obtained by subtracting from the operating voltage of each clamping type overvoltage protective component, the spark-over voltage of the other discharge tubes connected in parallel to the clamping type overvoltage protective component, and at the same time higher than the operating voltage of each discharge tube connected in series to any one of the clamping type overvoltage protective components.

9. An overvoltage protective device with one or more discharge units and one or more varistors, the overvoltage protective device comprising:
- a number n of discharge units ($E_1, E_2, \ldots, E_n$) connected in series;
- a varistor $V_1$ of which one terminal is connected between the discharge units $E_i$ and $E_{i+1}$; and
- a varistor $V_2$ of which one terminal is connected between the discharge units $E_{n-i}$ and $E_{n-i+1}$, where n is an integer of 3 or more and i is an integer satisfying $1 \leq i < n/2$,
- wherein the overall operating voltage of the discharge units $E_{i+1}$ to $E_{n-i}$ is lower than a voltage obtained by subtracting from the operating voltage of the varistor $V_1$, the overall spark-over voltage of the discharge units $E_{n-i+1}$ to $E_n$, and a voltage obtained by subtracting from the operating voltage of the varistor $V_2$, the overall spark-over voltage of the discharge units $E_1$ to $E_i$, and at the same time higher than the overall operating voltage of the discharge units $E_1$ to $E_i$ and the overall operating voltage of the discharge units $E_{n-i+1}$ to $E_n$.

10. The overvoltage protective device according to claim 9, wherein one terminal of the varistor $V_1$ is made conductive to an external terminal in the discharge unit $E_n$ side, and one terminal of the varistor $V_2$ is made conductive to an external terminal in the discharge unit $E_1$ side.

11. The overvoltage protective device according to claim 9, wherein n=3, and i=1.

12. The overvoltage protective device according to claim 9, wherein the discharge unit comprises a discharge tube and a clamping type overvoltage protective component.

13. The overvoltage protective device according to claim 12, wherein the discharge unit comprises:
- three or more discharge tubes connected in series; and
- two or more clamping type overvoltage protective components connected in parallel to the discharge tubes except one or more discharge tubes, wherein the overall operating voltage of the discharge tubes connected in parallel to all the clamping type overvoltage protective components is lower than any voltage obtained by subtracting from the operating voltage of each clamping type overvoltage protective component, the spark-over voltage of the other discharge tubes connected in parallel to the clamping type overvoltage protective component, and at the same time higher than the operating voltage of each discharge tube connected in series to any one of the clamping type overvoltage protective components.

14. A method of overvoltage protection using one or more discharge tubes and one or more clamping type overvoltage protective components, wherein:
- three or more discharge units are connected in series between two conductors;
- two or more clamping type overvoltage protective units are connected in parallel to the discharge units except one or more of the discharge units;
- the overall operating voltage of the discharge units connected in parallel to all the clamping type overvoltage protective units is set lower than any voltage obtained by subtracting from the operating voltage of each clamping type overvoltage protective unit, the spark-over voltages of the other discharge units connected in parallel to the clamping type overvoltage protective unit; and
- the overall operating voltage of the discharge units connected in parallel to all the clamping type overvoltage protective units is set higher than the operating voltage of each discharge unit connected in series to any one of the clamping type overvoltage protective units.

15. A method of overvoltage protection using one or more discharge tubes and one or more clamping type overvoltage protective components, wherein when n is an integer of 3 or more and i is an integer satisfying $1 \leq i < n/2$:
- a number n of discharge units ($E_1, E_2, \ldots, E_n$) are connected in series between two conductors;
- one terminal of a clamping type overvoltage protective unit $V_1$ is connected between the discharge units $E_i$ and $E_{i+1}$;
- the other terminal of the clamping type overvoltage protective unit $V_1$ is made conductive to an external terminal in the discharge unit $E_n$ side;
- one terminal of a clamping type overvoltage protective unit $V_2$ is connected between the discharge units $E_{n-i}$ and $E_{n-i+1}$;
- the other terminal of the clamping type overvoltage protective unit $V_2$ is made conductive to an external terminal in the discharge unit $E_1$ side;
- the overall operating voltage of the discharge units $E_{i+1}$ to $E_{n-i}$ is set lower than a voltage obtained by subtracting from the operating voltage of the clamping type overvoltage protective unit $V_1$, the overall spark-over voltage of the discharge units $E_{n-i+1}$ to $E_n$, and a voltage obtained by subtracting from the operating voltage of the clamping type overvoltage protective unit $V_2$, the overall spark-over voltage of the discharge units $E_1$ to $E_i$; and
- the overall operating voltage of the discharge units $E_{i+1}$ to $E_{n-i}$ is set higher than the overall operating voltage of the discharge units $E_1$ to $E_i$ and the overall operating voltage of the discharge units $E_{n-i+1}$ to $E_n$.

16. A method of overvoltage protection using one or more discharge units and one or more varistors, wherein when n is an integer of 3 or more and i is an integer satisfying $1 \leq i < n/2$:
- a number n of discharge units ($E_1, E_2, \ldots, E_n$) are connected in series between two conductors;
- one terminal of a varistor $V_1$ is connected between the discharge units $E_i$ and $E_{i+1}$;
- the other terminal of the varistor $V_1$ is made conductive to an external terminal in the discharge unit $E_n$ side;
- one terminal of a varistor $V_2$ is connected between the discharge units $E_{n-i}$ and $E_{n-i+1}$;
- the other terminal of the varistor $V_2$ is made conductive to an external terminal in the discharge unit $E_1$ side;
- the overall operating voltage of the discharge units $E_{i+1}$ to $E_{n-i}$ is set lower than a voltage obtained by subtracting from the operating voltage of the varistor $V_1$, the overall spark-over voltage of the discharge units $E_{n-i+1}$ to $E_n$, and a voltage obtained by subtracting from the operating voltage of the varistor $V_2$, the overall spark-over voltage of the discharge units $E_1$ to $E_i$; and
- the overall operating voltage of the discharge units $E_{i+1}$ to $E_{n-i}$ is set higher than the overall operating voltage of the discharge units $E_1$ to $E_i$ and the overall operating voltage of the discharge units $E_{n-i+1}$ to $E_n$.

* * * * *